(12) United States Patent
Hirschmann (10) Patent No.: US 12,276,378 B1
(45) Date of Patent: Apr. 15, 2025

(54) FLEXIBLE MAGNETIC MOUNTING SYSTEM FOR DEVICES

(71) Applicant: Thomas Hirschmann, Evergreen, CO (US)

(72) Inventor: Thomas Hirschmann, Evergreen, CO (US)

( * ) Notice: Subject to any disclaimer, the term of this patent is extended or adjusted under 35 U.S.C. 154(b) by 0 days.

(21) Appl. No.: 18/887,224

(22) Filed: Sep. 17, 2024

(51) Int. Cl.
| | | |
|---|---|---|
| *F16M 13/02* | (2006.01) | |
| *A45F 5/02* | (2006.01) | |
| *B60R 11/02* | (2006.01) | |
| *G03B 17/56* | (2021.01) | |
| *B60R 11/00* | (2006.01) | |

(52) U.S. Cl.
CPC .............. *F16M 13/022* (2013.01); *A45F 5/02* (2013.01); *B60R 11/02* (2013.01); *G03B 17/561* (2013.01); *A45F 2200/0533* (2013.01); *B60R 2011/0057* (2013.01)

(58) Field of Classification Search
CPC . F16M 13/022; A45F 5/02; A45F 2200/0533; B60R 11/02; B60R 2011/0057; G03B 17/561
See application file for complete search history.

(56) References Cited

U.S. PATENT DOCUMENTS

| | | | | |
|---|---|---|---|---|
| 4,907,769 A | * | 3/1990 | Hunley, Jr. | ............ F21V 21/145 248/185.1 |
| 7,448,812 B2 | * | 11/2008 | Heibel | ..................... B60R 11/04 396/419 |
| 7,808,392 B1 | | 10/2010 | Anklesaria | |
| 8,831,415 B2 | * | 9/2014 | Greenthal | ............ H04N 23/695 396/419 |
| D762,942 S | * | 8/2016 | Patulski | ......................... D2/853 |
| 9,577,417 B2 | * | 2/2017 | Stechmann | ................ F16B 1/00 |
| 10,480,711 B1 | | 11/2019 | Tran et al. | |
| 11,618,390 B2 | * | 4/2023 | Puchini | ................ G03B 15/006 348/148 |
| 11,714,340 B1 | | 8/2023 | Ibragimov et al. | |
| 12,075,905 B2 | * | 9/2024 | Abreu | ..................... A45C 11/00 |
| 2008/0164267 A1 | | 7/2008 | Huber | |
| 2013/0200224 A1 | * | 8/2013 | Bergreen | ............... F16M 11/10 403/376 |
| 2014/0182088 A1 | * | 7/2014 | Roberts | ..................... A45F 5/02 24/303 |
| 2015/0286117 A1 | * | 10/2015 | Sung | .................... F16M 11/041 248/220.22 |
| 2016/0286944 A1 | | 10/2016 | Snyder | |
| 2018/0325247 A1 | | 11/2018 | Vlassis et al. | |
| 2019/0098968 A1 | | 4/2019 | Quintero et al. | |
| 2021/0052059 A1 | | 2/2021 | McMillan, II et al. | |
| 2022/0325850 A1 | | 10/2022 | Park | |

\* cited by examiner

*Primary Examiner* — Monica E Millner
(74) *Attorney, Agent, or Firm* — Colorado Venture Patents LLC (57) ABSTRACT

The mounting system comprises flexible arms with embedded magnets for secure attachment to various surfaces. Interchangeable pucks allow connection of different devices. The system features a magnetic force multiplication effect when bodies are aligned on opposite sides of an object, enhancing holding power. Constructed from durable materials, the system offers safety, convenience, and versatility across applications. Pucks can incorporate tracking technology for device recovery. The design allows quick adjustments and angle changes, making it suitable for dynamic environments like winter sports, industrial settings, and creative filming.

16 Claims, 8 Drawing Sheets

FLEXIBLE MAGNETIC MOUNTING SYSTEM FOR DEVICES

FIELD OF THE INVENTION

The present invention relates to mounting systems, particularly to a flexible, magnetic mounting system designed for securing action cameras and other devices to various surfaces and objects in multiple environments.

DESCRIPTION OF THE RELATED ART

Action cameras, such as those produced by GoPro, are popular for capturing dynamic, first-person perspectives in sports and other activities. However, existing mounting solutions for these cameras often present several challenges.

Traditional camera mounts, particularly those designed for chest placement, pose significant safety risks during physical activities. These mounts often involve rigid structures that can lead to discomfort or injury upon impact, such as during falls or collisions. The rigid nature of these mounts can interfere with protective gear or even become a point of impact that exacerbates injury rather than preventing it. This issue is particularly critical in high-impact sports or activities where the risk of sudden impacts is high. Consequently, the safety concerns associated with these mounts have led to restrictions or outright bans by various sports authorities, who cite the potential for increased harm to the wearer.

The safety issues associated with traditional mounts have not only affected user safety but also compliance with sports regulations. Many organized sports and recreational activities have strict guidelines regarding equipment and accessories that participants can use during events. Traditional mounts often fail to meet these safety standards, leading to their prohibition in certain sports. This regulatory environment necessitates a mounting solution that can be safely used without violating rules or exposing participants to unnecessary risks.

The limitations of traditional mounts highlight the need for an innovative solution that prioritizes safety without compromising functionality. A mount that offers flexibility and reduces rigid components can significantly decrease the risk of injury. By integrating materials and designs that absorb impact and conform more naturally to the body or the mounting surface, such a solution would address the critical safety concerns that currently limit the use of action camera mounts in various physical activities. This approach would not only enhance wearer safety but also potentially expand the approval of camera mounts in regulated environments, offering users greater freedom and security in capturing their experiences.

The prevalent use of manual screwing mechanisms in current camera mounts presents significant convenience issues for users. This traditional method requires users to manually tighten screws to secure the camera, a process that is not only time-consuming but also cumbersome, especially in environments where dexterity is compromised, such as in cold weather or when wearing gloves. The need to remove gloves or pause activities to adjust or relocate the camera interrupts the user experience and can lead to missed moments or decreased productivity, particularly in dynamic settings like sports or active filming scenarios.

The interruptions required to adjust traditional mounts can significantly detract from the overall user experience. For enthusiasts and professionals alike, the ability to quickly and effortlessly adjust camera angles or positions is crucial. The manual screwing mechanisms not only slow down this process but also introduce a level of frustration and inefficiency, which can affect the quality and quantity of the captured content. This is particularly problematic in environments where timing and speed are critical, such as in documentary filmmaking or fast-paced sports.

These inconveniences underscore the need for a more user-friendly mounting solution that eliminates the need for manual screwing and allows for quick, tool-free adjustments. A mount incorporating magnetic attachments, for example, could offer a significant improvement by enabling users to easily attach or adjust their cameras with minimal effort and without the need to halt their activities. Such a solution would not only enhance the convenience and usability of camera mounts but also broaden their appeal to a wider range of users, from amateur adventurers to professional cinematographers, who require quick and reliable adjustments in diverse operating conditions.

Traditional camera mounts are typically engineered for attachment to flat, stable surfaces, which significantly limits their versatility. This design constraint means that they cannot securely attach to non-planar or irregular surfaces, which are commonly encountered in various real-world environments such as outdoor landscapes or in automotive contexts. For instance, adventurers looking to capture video while hiking, climbing, or participating in off-road activities often find that conventional mounts fail to adhere securely to natural surfaces like rocks, tree limbs, or vehicle exteriors. This limitation not only restricts the usability of the mounts but also affects the quality and feasibility of capturing dynamic, immersive content in diverse settings.

The inability of traditional mounts to adapt to varied surfaces severely restricts their practical applications. In professional settings, such as in the automotive industry or in field research, the need to attach cameras or other equipment securely on non-flat surfaces is common. The lack of flexibility in existing mount designs can hinder the effectiveness of these tools, leading to compromised safety, reduced efficiency, and limited angles for documentation or monitoring. This is particularly problematic in industries where detailed visual access in complex environments is crucial, such as during machinery inspections or in wildlife documentation.

The limitations highlighted by traditional mounting systems underscore the necessity for a more adaptable solution that can conform to a variety of shapes and surfaces. A mount that incorporates flexible arms and adjustable components could provide a much-needed enhancement in this area, offering secure attachment not only to flat surfaces but also to those that are curved, angular, or textured. Such versatility would greatly expand the utility of mounts across different sectors and activities, enabling users to deploy their cameras and other devices in previously challenging or inaccessible locations, thereby broadening the scope and capabilities of their equipment.

The materials commonly used in existing camera mounts often fail to withstand the rigors of extreme environmental conditions. Many mounts are made from plastics or metals that are not suited to extreme temperatures, which can lead to their deformation, brittleness, or failure. This is particularly problematic for users who engage in activities in harsh climates, such as mountaineering in cold environments or desert photography, where temperatures can drastically affect the integrity of mount materials. Additionally, prolonged exposure to elements such as UV rays, moisture, and salt can accelerate the wear and tear on these materials, further reducing their lifespan and reliability.

The degradation of materials not only shortens the lifespan of the mounts but also impacts their performance and safety. As the materials weaken, the risk of a mount failing during use increases, which can lead to equipment damage or loss, and in some cases, safety hazards for the user. For professionals and enthusiasts alike, the reliability of mount materials is crucial for ensuring that equipment remains secure and functional throughout its intended use, regardless of environmental conditions. The failure of a mount due to material degradation can result in significant financial losses and missed opportunities to capture crucial moments.

These material limitations highlight the need for mounts constructed from more durable, resilient materials that can withstand a wide range of environmental conditions without degrading. Materials such as commercial urethane, which is known for its durability, temperature resistance, and UV stability, offer a promising alternative. By utilizing such materials, the next generation of mounts could significantly extend the operational life and reliability of these devices, ensuring that they remain functional and secure in a variety of challenging conditions. This would not only enhance user confidence in the equipment but also expand the potential applications of mounts in more extreme and varied environments.

For the above and other reasons, it remains desirable to provide an improvement over traditional mounting systems.

SUMMARY OF THE INVENTION

The preferred embodiment of the invention presents a novel mounting system designed to address the limitations of traditional camera mounts by enhancing safety, convenience, versatility, and durability associated with mounting items that otherwise might not be considered wearable.

The preferred embodiment of the invention comprises flexible arms equipped with strong magnetic components that facilitate easy and secure attachment to a variety of surfaces, especially including clothing. These magnets, capable of holding significant weight, allow for rapid adjustments without the need for tools. In the preferred embodiment, the flexible arms are made from durable material such as commercial urethane, ensuring durability and stability across extreme temperatures and environmental conditions.

This innovative design of the preferred embodiment not only makes the mounting system safer and more user-friendly but also extends its applicability beyond traditional uses, accommodating a wide range of activities and industries. The preferred embodiment of the invention is poised to fundamentally alter the way cameras and other devices are mounted, offering a safer, more convenient, versatile and fundamentally different alternative to existing mounting solutions.

DETAILED DESCRIPTION

The preferred embodiment of the invention pertains to a novel mounting system designed to securely attach cameras and other devices to various surfaces and objects. This system addresses the limitations of traditional mounts by offering enhanced safety, increased convenience, greater versatility, and improved durability. The design incorporates a main body 100 comprising flexible arms 110 with integrated magnetic components and is constructed from high-quality, resilient materials.

Each of the flexible arms 110 of the main body 100 in the preferred embodiment is constructed from a high-grade commercial urethane, known for its exceptional flexibility and durability. This material choice allows the arms to be both sturdy and pliable, capable of bending and wrapping around objects without losing structural integrity or breaking. Strategically placed within each arm in the preferred embodiment are neodymium magnets. These magnets are chosen for their strong magnetic force relative to their size, allowing for secure attachment to any metallic surface, a body substantially mirroring the main body that comprises embedded magnets, 120, or to opposing individual magnets 125 in association with intended use cases.

The flexible arms 110 are designed with a specific length and diameter to optimize flexibility and magnetic strength. The length allows sufficient reach to encircle larger objects in accordance with some intended use cases, while the diameter is slim enough to ensure easy manipulation but robust enough to prevent sagging or bending under the weight of attached devices. In a preferred usage, the arms of the main body 100 are placed corresponding to the arms of another body mirroring the main body 120 on another side of an object 400, such as fabric, to allow the opposing magnets to generate a clamping force upon the object 400 as depicted by FIG. 6B.

Each magnet within the flexible arms 110 in an embodiment is rated for a specific holding force, calculated to support the weight of common devices used with the mount, such as cameras, lights, or tools. The magnetic strength is balanced to provide a strong hold without being overly difficult to detach when adjustments are needed.

The multi-arm design in embodiments distributes the weight and tension substantially evenly in embodiments when placed upon clothing, reducing the risk of slippage or detachment. This design is particularly effective in maintaining stability and security, even in dynamic environments where movement or vibrations may be present. The inherent flexibility of the arms allows the mount to conform to a wide range of shapes.

The mounting system in its preferred embodiment features two mirrored bodies, including one main body 100 configured to retain an object and another substantially mirrored opposing body with corresponding embedded magnets 120 for placement on the other side of an object such as clothing in accordance with an intended use. In an embodiment, each body comprises three flexible arms 110, which form the core structural component. This tri-arm configuration provides a stable and versatile base that can adapt to various attachment needs. The three arms are strategically designed to maximize stability and flexibility. In alternative embodiments, each of the mirrored bodies comprises an amount of flexible arms 110 of plural number other than three.

The three flexible arms 110 of the main body 100 in an embodiment comprise two top arms and a bottom arm. The two top arms are primarily responsible for gripping and securing to a more superior portion of an object, such as clothing, or surface. Their positioning allows for an adaptable grip that can conform to the contours of the object being mounted by substantially aligning with the two top arms of a corresponding mirrored body placed on the other side of the object. In an embodiment, the bottom arm acts as a stabilizing force, anchoring the mount by attaching via clamping magnetic force to a corresponding bottom arm of a mirrored body placed on the opposite side of an object, and providing additional support. In association with an exemplary use, the bottom arm is particularly useful in balancing the mount on uneven or sloped surfaces.

In embodiments, the flexible arms 110 of a main body 100 are in essence equally responsible to gripping and securing to an object via clamping magnetic force following alignment of magnets to flexible arms 110 of a second mirrored body placed on the opposite side of an object, such as clothing.

Each of the flexible arms 110 of the main body 100 in the preferred embodiment is constructed from a high-grade commercial urethane, known for its exceptional flexibility and durability. This material choice ensures that the flexible arms 110 can be bent or twisted to a significant degree without risking damage or loss of functionality. In accordance with the preferred embodiment, the main body 100 further comprises a mount of one of a variety of configurations. The inherent flexibility of the material of the flexible arms 110 in accordance with an intended use allows the flexible arms 110 to wrap around a variety of objects, from cylindrical poles to angular structures, making the mount suitable for diverse environments.

In the preferred embodiment, the system incorporates magnetic components that are integral to its functionality and versatility. Each of the flexible arms 110 of the main body 100 is embedded with high-quality magnets 115, which are designed to provide a substantial holding force to secure the mount in place across various applications. In the preferred embodiment, the magnets 115 are circular and disk shaped. In the preferred embodiment, the magnets 115 are located substantially distal from the intersection point 111 of each of the flexible arms 110 of a body.

In an embodiment, within each flexible arm, magnets 115 are embedded. These magnets 115 are crucial for providing a secure attachment to metallic surfaces without the need for clamps or screws. Each magnet 115 embedded in the arms in an embodiment offers approximately 2.5 lbs of holding force, which can be enhanced by stacking additional bodies substantially mirroring the main body 100, or additional magnetic discs for force multiplication 126 upon each of the magnets 115 of the flexible arms 110, as depicted in an example by FIG. 2, for a combined force of up to 5 lbs. This force is sufficient for stable attachment in most everyday applications, ensuring that devices or tools attached to the mount remain secure even under conditions of movement or vibration. When the magnets from multiple arms are used in conjunction, they collectively provide about 5 pounds of holding force, enhancing the stability and security of the mount. This feature is particularly beneficial for quick setups and adjustments, as it eliminates the need for tools and manual fastening.

Figure 2:
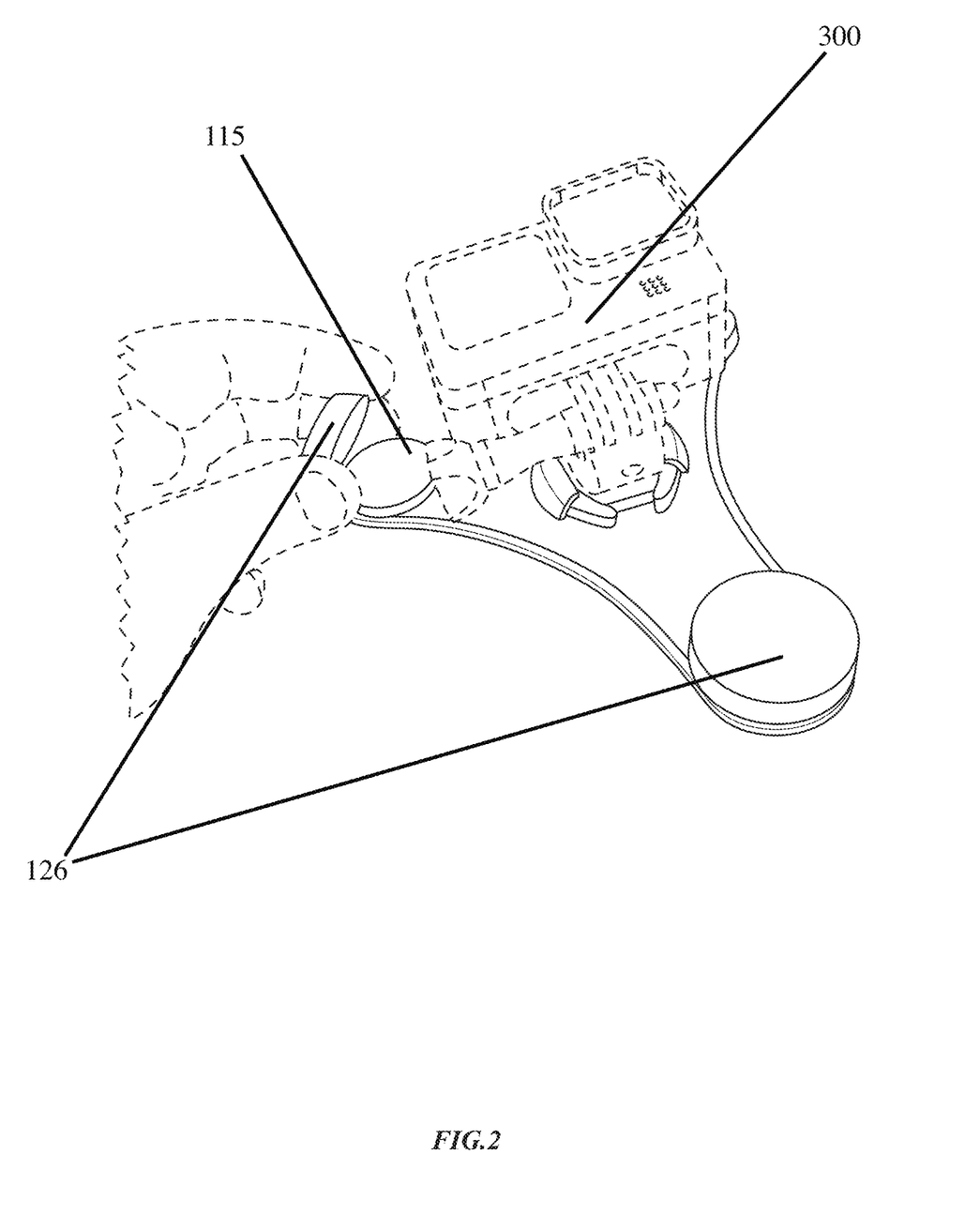
FIG. 2 depicts an embodiment of the invention comprising an expansion disc.
Figure 3A:
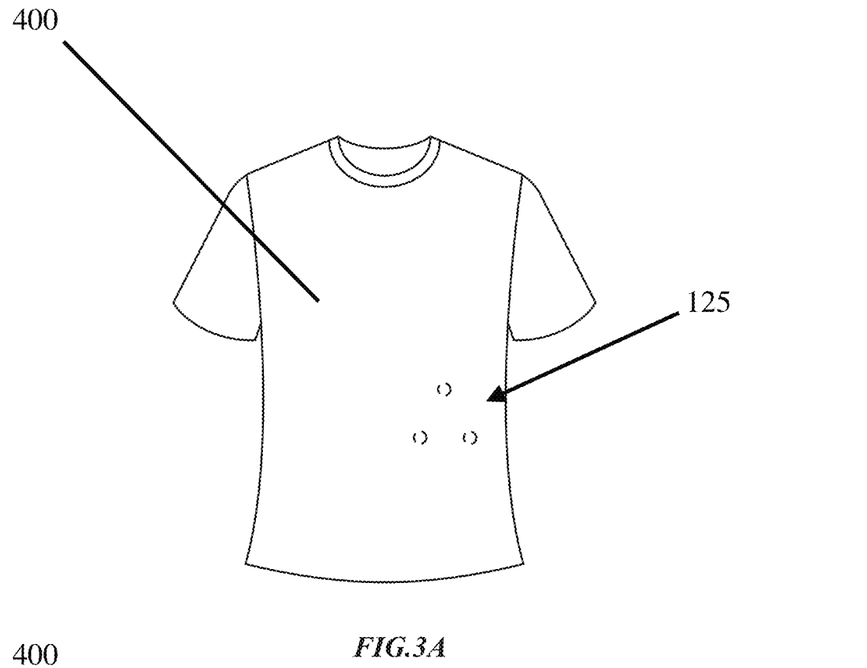
FIGS. 3A and 3B depict placement of magnetic discs on the interior of a garment in accordance with an exemplary intended use.
Figure 3B:
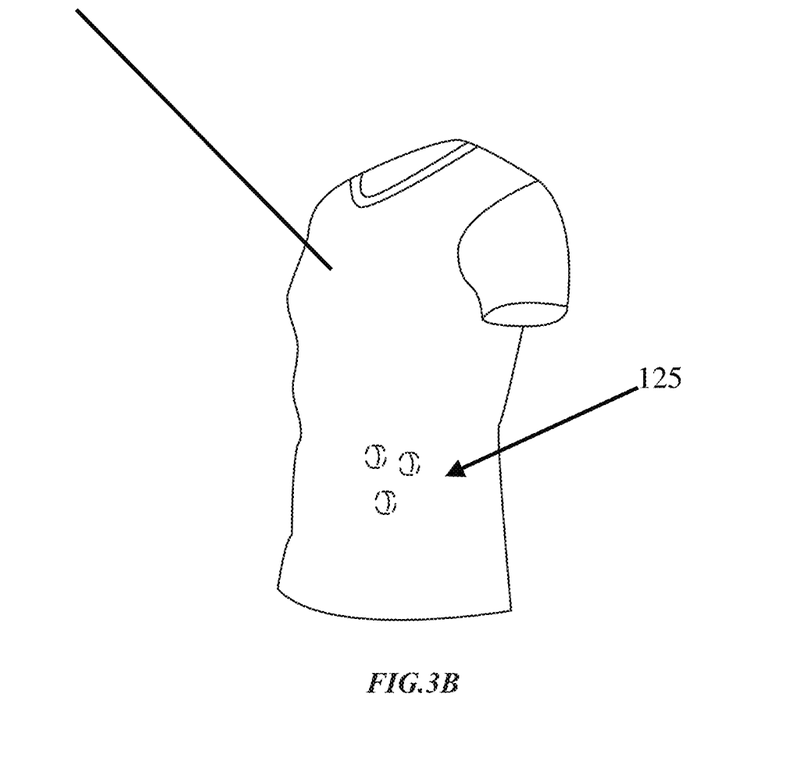

For applications requiring even greater stability, the design of the magnetic components allows for the stacking of magnets, as depicted by FIG. 2. This stacking capability is a feature of the preferred embodiment that can increase the total magnetic holding force by up to 80%. This significant boost in holding power is essential for heavier or more demanding applications, such as securing equipment in industrial settings or in environments with high levels of activity and motion. The system's design facilitates a magnetic force multiplication effect achieved through the stacking of magnetic discs for force multiplication 126 upon or substantially near to one or more of the magnets embedded within the flexible arms 115, which significantly enhances its versatility and applicability across various settings. In scenarios where one body of the mount, equipped with magnets, is placed on the interior of a piece of clothing and a corresponding body with magnets is aligned on the exterior, the magnetic forces from both bodies interact to create a compounded magnetic effect. This interaction effectively doubles the magnetic holding force exerted through the clothing, ensuring that the main body 100 and the mount remain securely in place despite the barrier posed by the fabric. This stacking and interaction of magnetic fields not only stabilize the main body 100 against slippage but also allow the mount of the main body 100 to carry heavier devices 300 or tools without compromise. The increased magnetic force ensures that even in dynamic environments or when subjected to movements and vibrations, the main body 100 maintains a robust grip, making it ideal for applications ranging from securing cameras during active sports to holding heavy tools in industrial work settings. This magnetic force multiplication is a critical feature that adapts the mounting system for heavier and more demanding uses, providing reliability and security in a wide array of practical applications.

In accordance with various embodiments, the multiplication of magnetic effects through placement of multiple bodies directly in alignment with and upon one another, or the addition of individual magnetic discs 126. When multiple bodies of the mount, each embedded with magnets 115, are stacked upon each other with their magnets precisely aligned, the magnetic fields from each body synergize to create a significantly stronger cumulative magnetic force. This alignment and stacking amplify the overall magnetic attraction, enabling the system to support heavier loads and provide a more secure attachment. Alternatively, the system also supports the enhancement of magnetic force by placing individual magnetic discs 126 near the magnets embedded in each flexible arm 115. These additional discs 126 act as force multipliers, intensifying the local magnetic field where they are placed. This flexibility in configuring the magnetic strength is particularly advantageous in scenarios requiring variable holding forces, such as in environments with varying levels of mechanical vibration or when different weights or sizes of equipment need to be securely mounted. This capability to customize the magnetic strength dynamically enhances the system's utility across a diverse range of applications, ensuring both adaptability and robust performance.

The present inventor has recognized that the magnetic components provide ease of use and flexibility of the system in accordance with the preferred embodiment. The magnetic force retention mechanism allows for quick adjustments and secure attachments without the need for manual screwing, facilitating a tool-free setup. This feature is particularly beneficial in scenarios where time and efficiency are crucial, such as in fast-paced work environments or during activities where adjusting the position of the mounted device needs to be as effortless as possible.

The magnets are designed to be durable and resistant to environmental factors that could potentially weaken their hold, such as moisture, dust, and temperature fluctuations. This durability ensures that the magnetic properties are maintained over time, providing long-term reliability and performance.

The design of the mounting system in its preferred embodiment incorporates a dual-body configuration, featuring a first mirrored body, optionally a main body 100, and a second mirrored body, where each body is equipped with flexible arms 110 embedded with magnets. This configuration allows for a unique method of securing the main body 100 and mount to clothing, enhancing both stability and ease of use without damaging the fabric.

Each body of the mounting system, referred to as the first body or main body 100 and the second body or opposing body 120 in accordance with an embodiment, is designed to mirror the other in terms of shape, size, and magnetic alignment. The flexible arms 110 on each body are strategically embedded with magnets that align oppositely, ensuring that when placed opposite each other on either side of a piece of clothing 400, they attract magnetically.

In embodiments, the mounting system incorporates one or more interchangeable pucks 130 that serve as the primary contact points for attaching various devices. These pucks 130 are designed to offer versatility and security in device attachment. In an embodiment, each puck 130 is constructed from durable ABS polyurethane, chosen for its strength and resistance to environmental factors such as temperature fluctuations and UV exposure. The material ensures that the pucks 130 remain robust and functional even under extreme conditions. The pucks 130 in an embodiment are engineered to be as low-profile as possible while still maintaining a high degree of structural integrity. This design minimizes wind resistance and visual obtrusiveness, making them suitable for a wide range of applications, including automotive uses where they can withstand speeds of up to 90 mph without detaching.

Figure 8:
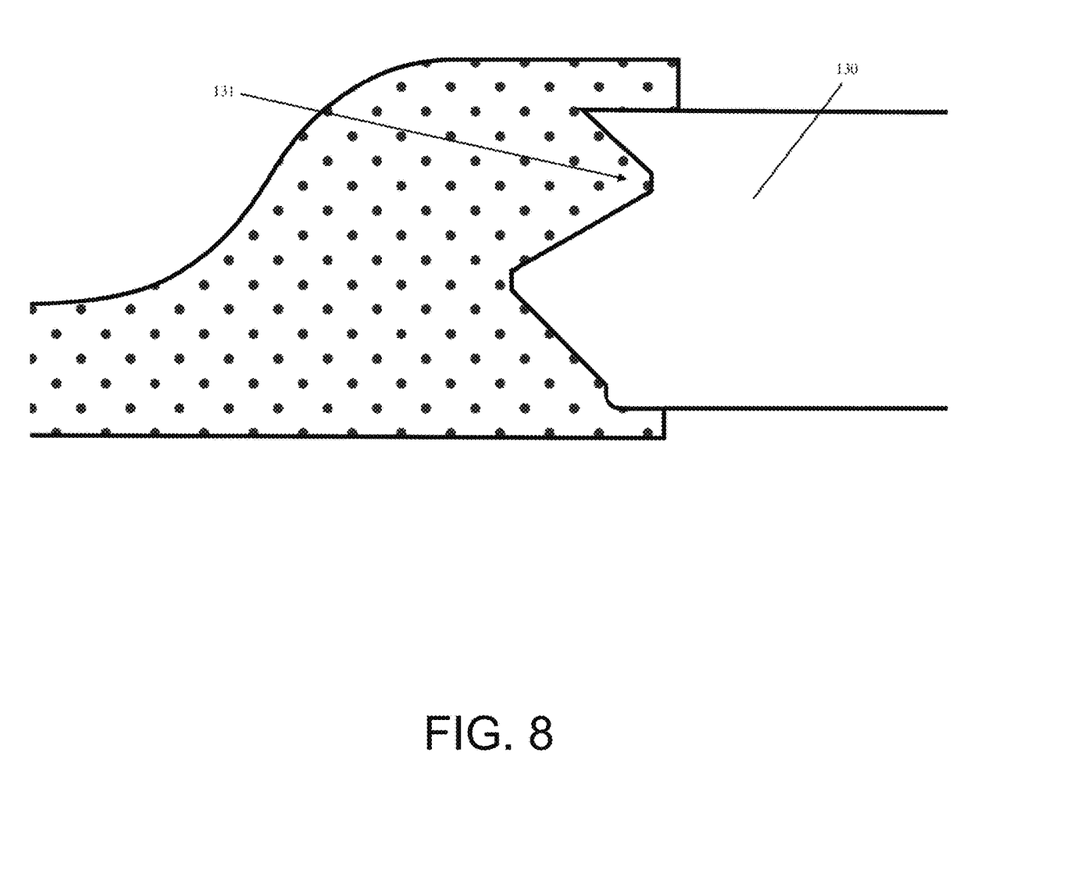
FIG. 8 depicts a cross sectional view of the interlocking profile of the retention groove in an exemplary embodiment.

In an embodiment, each puck 130 comprises a retention groove 131 that encircles its perimeter. In an exemplary embodiment, the cross sectional profile of the retention groove 131 is depicted by FIG. 8. This groove 131 is designed to securely lock the puck 130 into place once attached to the mounting system, preventing slippage or rotation of the device during use. The groove 131 also facilitates easy interchangeability of the pucks 130, allowing users to swap out devices quickly and securely.

The mounting system in an embodiment incorporates a specialized receptacle designed to complement and securely hold the interchangeable pucks 130. In the preferred embodiment, this receptacle is an integral part of the mounting system's body, constructed from the same high-grade commercial urethane material used for the flexible arms 110. This design choice ensures consistency in material properties throughout the system, enhancing overall durability and functionality.

The urethane composition of the receptacle in an embodiment provides a unique combination of flexibility and retention strength. The flexibility allows the receptacle to deform slightly as the puck is inserted, creating a snug fit that securely holds the puck in place during use. This flexible yet secure connection is crucial for maintaining the stability of attached devices, especially in dynamic environments or during active use.

The receptacle features a groove engagement mechanism specifically designed to interact with the retention groove on the puck. This mechanism, which may consist of a raised lip or a series of flexible clips, aligns with and fits snugly into the puck's retention groove. The urethane material's inherent flexibility allows these engagement features to deform slightly during puck insertion and removal, providing a secure lock while still allowing for easy interchangeability of pucks. The receptacle is made from the same flexible urethane material as the rest of the main body, ensuring compatibility and durability. This design choice allows the receptacle to deform slightly as the puck is inserted, creating a snug fit that securely holds the puck in place during use.

A key innovation in the receptacle design in accordance with the preferred embodiment is its ability to allow rotational adjustment of the inserted puck. The urethane material's properties are carefully calibrated to provide enough resistance to hold the puck at a desired angle during operation, while still allowing for adjustment with a small amount of applied force. This feature significantly enhances the versatility of the mounting system, enabling users to fine-tune the orientation of attached devices without needing to reposition the entire mount.

Figure 4A:
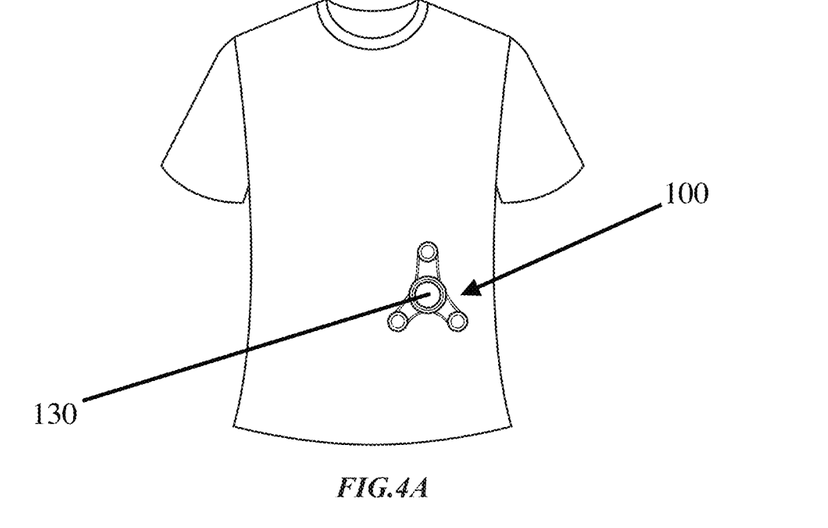
FIGS. 4A and 4B depict placement of the main body in alignment with the placement of magnetic discs on the interior of a garment as depicted in FIGS. 3A and 3B in accordance with an exemplary intended use.
Figure 4B:
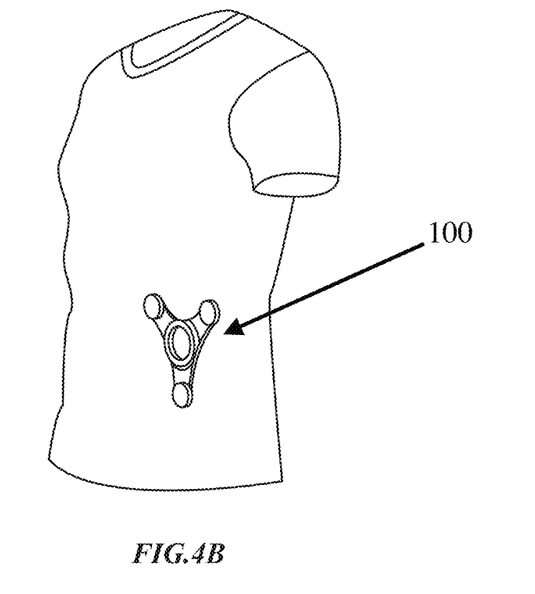

The receptacle and mount are strategically integrated in association with or within the main body 100 at the intersection point 111 of the flexible arms 110 in accordance with an embodiment, as depicted in FIG. 4A. This low-profile design maintains the overall sleekness of the mount while leveraging the stability provided by the arms' configuration. Importantly, this placement optimizes the utilization of magnetic fields from the embedded magnets 115 in the flexible arms 110. By positioning the receptacle and mount at these intersection point 111, the system avoids placing the puck 130 between the magnets of corresponding bodies, which could interfere with the direct magnetic forces between the flexible arms 110. This design enhances the overall holding power of the system while still providing a secure and adjustable attachment point for various devices.

The combination of the urethane material of the main body 100, the groove engagement mechanism, and the strategic placement of the receptacle creates a mounting system that is not only secure and durable but also highly adaptable to various use cases in accordance with an embodiment. The ability to easily insert, securely hold, and adjust the angle of attached devices makes this system suitable for a wide range of applications, from action sports photography to industrial tool mounting.

In the preferred embodiment, inserting the puck 130 into the receptacle is straightforward and user-friendly. The puck 130 is aligned with the receptacle forming a part of the main body 100 at the intersection point 111 in an embodiment, and a slight pressure is applied until the clips or lip of the receptacle engage with the retention groove on the puck 130. This engagement in an embodiment produces a click or tactile feedback, indicating that the puck 130 is securely locked in place. Removal involves applying a reverse pressure or activating a release mechanism, which disengages the puck 130 from the receptacle for easy removal or interchange. Once engaged, the puck 130 is held firmly within the receptacle, with minimal play or movement. This secure fit ensures that any device 300 attached to the puck 130, such as a camera or light, remains stable and correctly aligned, providing optimal functionality and reducing the risk of damage due to vibrations or impacts.

In the preferred embodiment, the puck 130 is strategically placed within a mount and/or receptacle of a main body 100 of the system at the intersection point 111 of the flexible arms 110 in accordance with an intended use. Positioning a puck 130 at the intersection point 111 of the flexible arms 110 distributes the weight of the attached devices evenly across the structure of the mounting system. This distribution helps maintain balance and reduces strain on any single flexible arm, enhancing the overall stability of the mounting system. The central placement of the puck 130 upon a receptacle strategically located at the intersection point 111 allows for the attachment of devices in a manner that is both aesthetically pleasing and functionally effective. In accordance with intended uses, devices 300 attached can be oriented in multiple directions, providing flexibility in how cameras, lights, or tools affixed to the receptacle and/or the mount are used.

The system in various embodiments is designed to allow for interchangeability of pucks 130, enabling users to switch between different puck 130 configurations with ease. Each puck 130, regardless of its specific configuration, is designed to fit securely into the same receptacle on the main body 100 of the system. In the preferred embodiment, to change from one configuration to another, a user simply removes the currently attached puck 130 by disengaging it from the receptacle's locking mechanism, which typically involves a slight pressure or a release action. The new puck, whether designed to retain a camera, a tablet, a RFID tag, an Apple AirTag, or another object, can then be inserted into the same receptacle. This puck is secured in place by the receptacle's engagement mechanism, clicking into the retention groove that encircles the puck's perimeter. This design not only ensures a secure and stable attachment for a variety of devices but also enhances the flexibility and utility of the mounting aspects of the system, making it adaptable to a wide range of applications and user needs.

The puck 130 of the preferred embodiment of the system is designed with versatility in mind, accommodating a wide range of devices 300 and functionalities through various interchangeable puck configurations. Each configuration is specifically tailored to enhance the utility of the puck 130 for different applications, ensuring broad usability from personal devices to professional equipment.

One configuration of the puck 130 features a puck 130 embedded with a magnet as depicted in FIG. 4A, which is ideal for attaching to any ferromagnetic surface, or retention of a metallic object upon the puck. This magnet is centrally embedded to maximize effectiveness and is coated to prevent corrosion and wear, making it useful in settings like automotive workshops for holding tools, or kitchens for securing utensils.

Another configuration of the puck 130 features a puck 130 comprising ¼-20 threaded insert, making it suitable for attaching cameras or any device that utilizes this common tripod mount thread. This design ensures devices are securely fastened and can be easily adjusted, catering to photographers, videographers, and hobbyists who need to quickly and securely mount cameras or lights in diverse settings.

Another configuration of the puck 130 comprises a puck 130 designed specifically for iPads or similar tablets. This puck comprises a custom-fitted cradle or clamp that securely holds the tablet, often adjustable for optimal viewing angles. This makes it perfect for use in educational environments, presentations, or any setting where mobile and adjustable platforms for information display are required.

Figure 1:
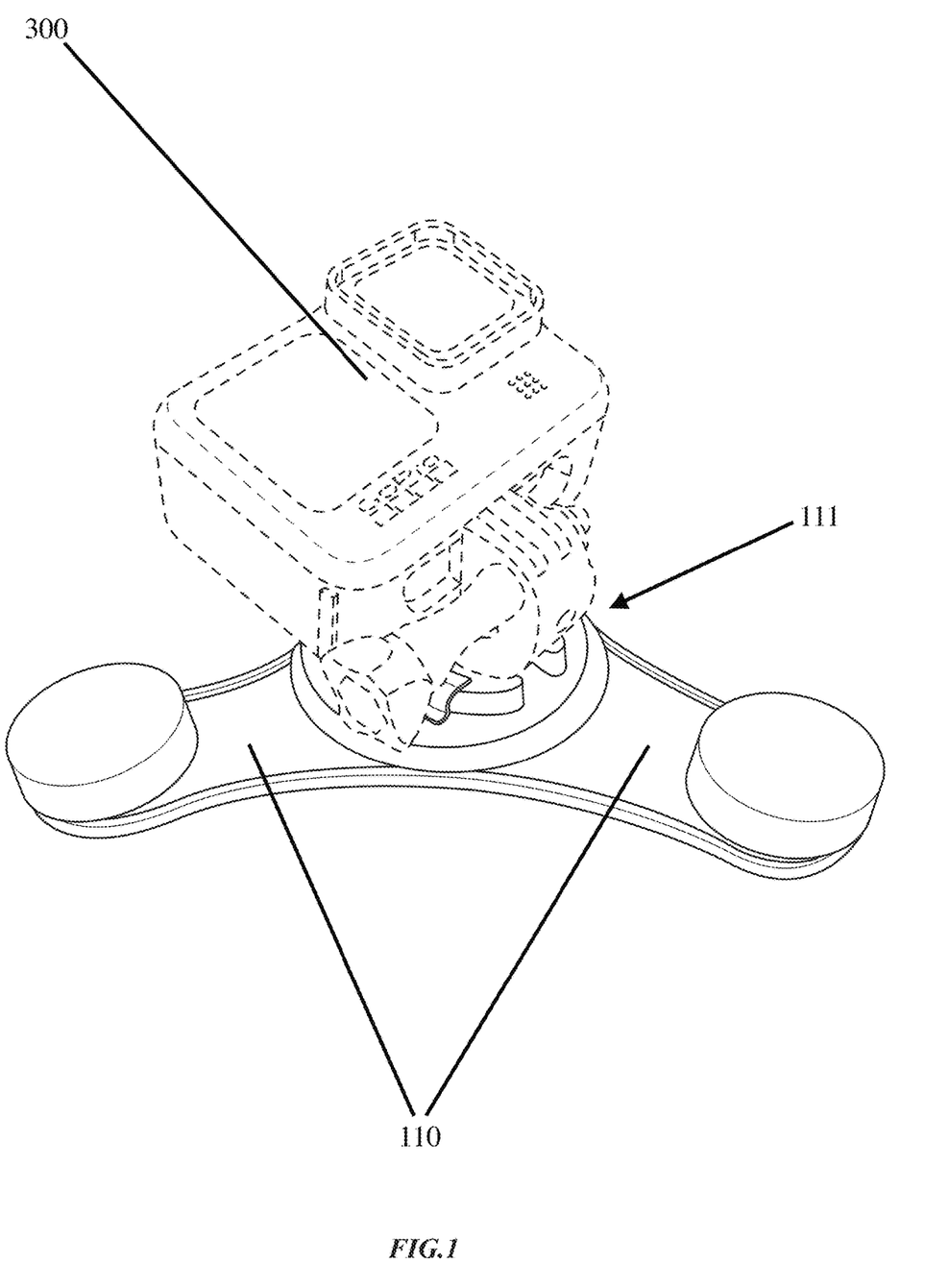
FIG. 1 depicts an embodiment of the invention comprising an attached action camera.
Figure 6A:
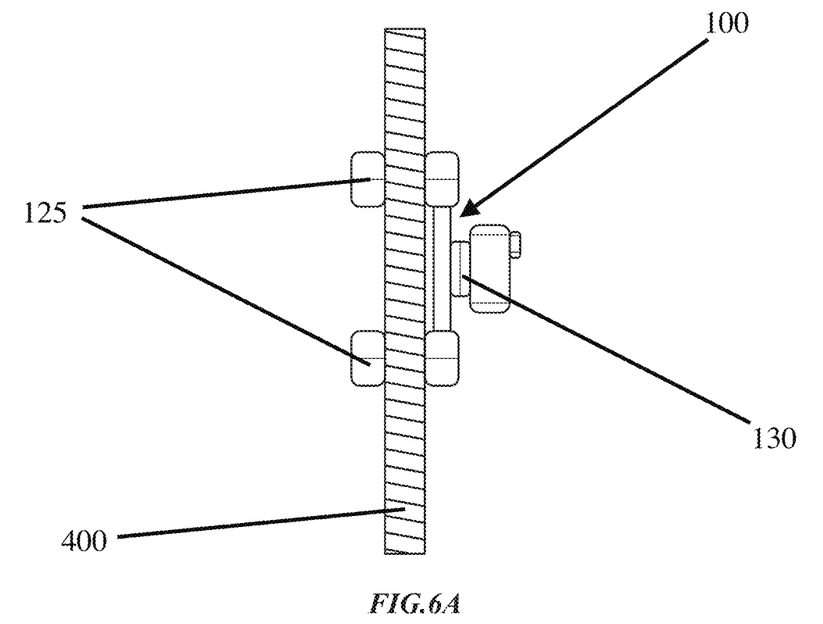
FIG. 6A depicts cross-sectional view of an exemplary embodiment comprising individual magnets placed on the interior of a garment with the main body placed in alignment on the opposite side of a garment while retaining an action camera in accordance with an intended use.
Figure 6B:
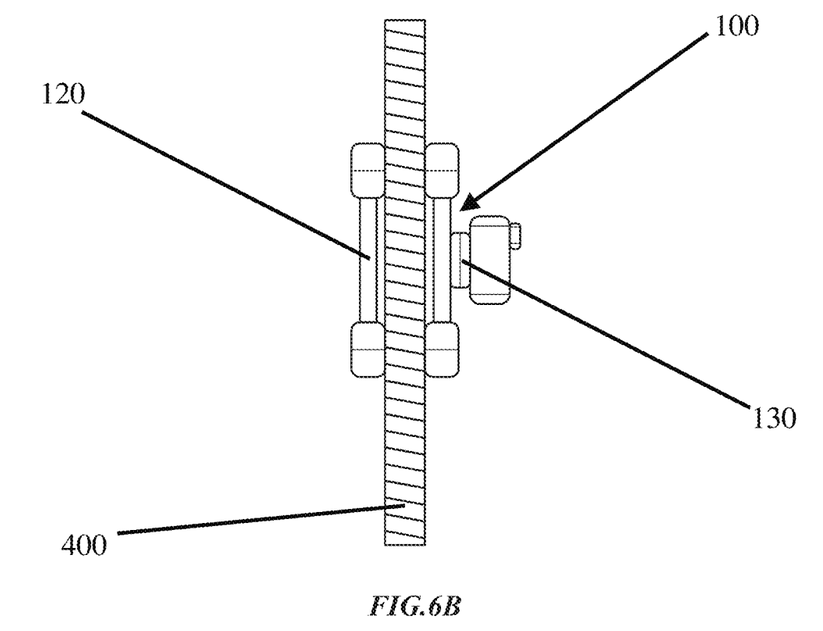
FIG. 6B depicts cross-sectional view of an exemplary embodiment comprising a unified body comprising magnets placed on the interior of a garment with the main body placed in alignment on the opposite side of a garment while retaining an action camera in accordance with an intended use.

Another configuration of the puck 130 in an embodiment features a puck comprising a GoPro mount puck 130 tailored to fit GoPro cameras, as depicted by FIG. 1, FIG. 6A and FIG. 6B. This puck 130 includes a mount compatible with GoPro's proprietary attachment system, allowing for secure and stable camera placement essential for capturing action shots and dynamic filming environments.

Additionally, in another configuration the puck comprises a receptacle specifically designed to hold an Apple AirTag or other similar RFID tags. It is particularly beneficial in logistics, personal security, or any scenario where item tracking is necessary. In an exemplary embodiment, the mounting system incorporates an innovative configuration for the puck that enhances its functionality beyond simple device attachment. In this configuration, the puck comprises a receptacle specifically designed to hold an Apple AirTag or other similar RFID tags. This design ensures that the tag is snugly fit and remains accessible and functional, providing a dual-purpose solution for both mounting and tracking. The integration of an AirTag or RFID tag into the puck serves multiple practical purposes. It allows for easy device recovery in scenarios where the mounted device becomes detached due to the system's safety release feature, such as during skiing accidents. In industrial or mechanical settings, the AirTag functionality can be used as a safety measure, allowing technicians to verify that no tools or mounts have been inadvertently left behind in areas like engine bays. The AirTag-enabled puck is also ideal for tracking valuable equipment, personal items, or even pets in various environments, making it particularly beneficial in logistics, personal security, or any scenario where item tracking is necessary. Furthermore, the AirTag can be added to the back of any puck configuration, allowing this tracking functionality to be combined with other mounting purposes. This means that cameras, lights, or other devices can be both securely mounted and easily trackable. This configuration demonstrates the system's adaptability to various use cases, combining the secure mounting capabilities with advanced tracking technology. It addresses practical concerns such as equipment loss prevention and safety verification, further enhancing the utility of the mounting system across diverse applications from recreational activities to professional and industrial use.

Figure 7:
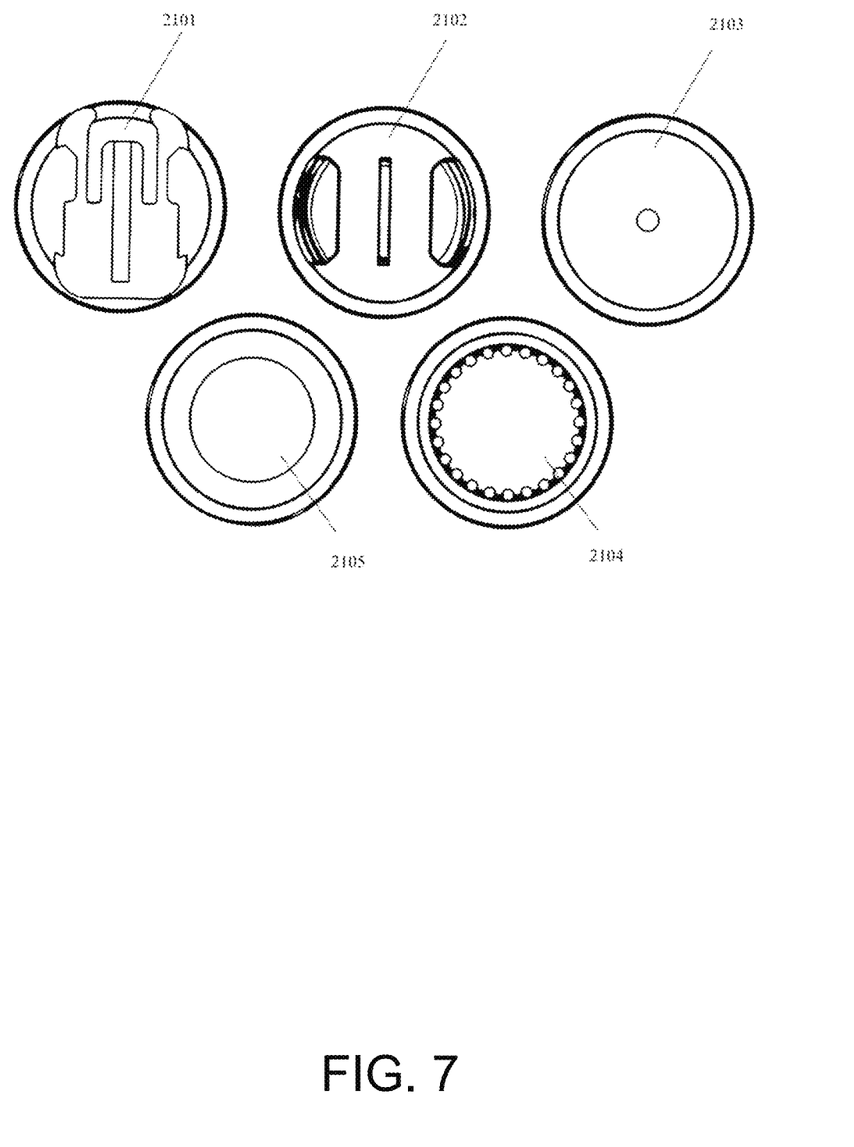
FIG. 7 depicts various puck configurations in accordance with embodiments of the invention.

In various embodiments the puck 130 is constructed from high-impact, durable materials such as ABS polyurethane or reinforced composites to withstand various environmental conditions and usage scenarios. The design of each puck 130 considers the weight, balance, and operational requirements of the devices they support, incorporating features like water resistance, shock absorption, and ease of device insertion and removal. For pucks 130 with embedded magnets, the strength and type of magnet are chosen based on the expected use and the weight of the objects to be supported, with shielding included to prevent magnetic interference with device operations. Various embodiments of the pucks in a variety of configurations are depicted by FIG. 7. In accordance with an embodiment, a puck is configured to comprise a male GoPro attachment 2101. In accordance with an embodiment, a puck is configured to comprise a female GoPro attachment 2102. In accordance with an embodiment, a puck is configured to comprise a ¼"-20 screw 2103, for example to accommodate various cameras. In accordance with an embodiment, a puck is configured to comprise a lanyard 2104. In accordance with an embodiment, a puck is configured to comprise a magnet 2105, which is intended to retain metallic or other magnetically compatible items via magnetic force.

This diverse range of puck 130 configurations within the mounting system demonstrates its adaptability and functionality, ensuring that the system can be employed effectively in a variety of environments and for multiple purposes, enhancing the system's overall utility and appeal.

In an exemplary use, the first body 100 is placed on the exterior of the clothing 400. Its flexible arms 110 can be adjusted to conform to the outer surface of the clothing 400, ensuring it follows the contours and curves of the fabric and the wearer's body shape. Correspondingly, the second body 120 is placed directly opposite the first body 100 but on the interior of the clothing. It mirrors the position and orientation of the first body 100, ensuring that the magnets in both bodies are aligned to create a strong magnetic force across the fabric.

The magnets embedded within the arms of the main body 115 placed opposite individual opposing magnets 125 or an opposing mirrored body comprising embedded magnets 120 generate a magnetic field strong enough to penetrate through the clothing 400, creating a secure attachment without the need for piercing or clamping mechanisms. This method ensures that the mount remains securely in place, even during vigorous movements or in windy conditions, yet can be easily repositioned or removed without leaving marks or damage to the clothing.

A primary application of this dual-body magnetic attachment system in association with its preferred embodiment is for active scenarios, such as sports or outdoor activities, where securing a camera or device to clothing is desirable for hands-free operation. For example, the system has been observed by the inventor to be useful in scenarios involving active filming. For instance, an individual participating in a cycling event can use this mounting system to secure an action camera to their jersey. The first mirrored body with its flexible arms 110 is adjusted on the exterior of the jersey, while the second mirrored body is placed inside, directly opposite the first. The magnetic force between the two bodies through the jersey fabric holds the camera securely in place, allowing for stable filming without the risk of the mount shifting or detaching.

Figure 5:
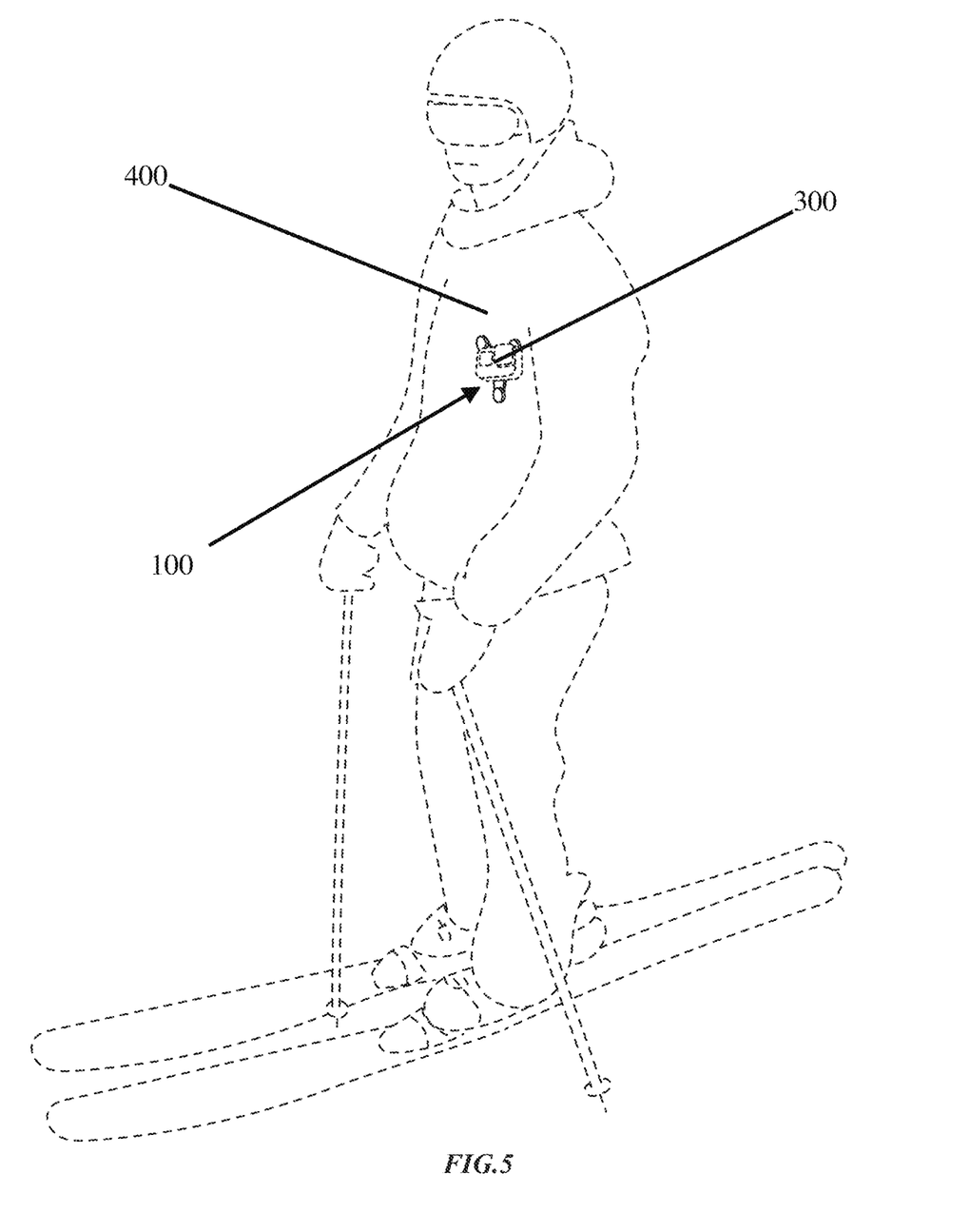
FIG. 5 depicts a placement of the system comprising an action camera in an embodiment attached to outerwear in accordance with an exemplary use associated with skiing.

Another exemplary use involves placement of the mount on clothing worn by a downhill skier, as depicted in FIG. 5, prior to engaging in such activity. In the context of downhill skiing, where dynamic movement and exposure to elements are constant, the dual-body magnetic attachment system offers a practical and robust solution for mounting devices such as action cameras or navigational aids directly onto the skier's clothing.

Prior to skiing, in an exemplary use, the skier attaches the first body, in this instance the exterior body, with its flexible arms 110 to the exterior of their ski jacket 400, as depicted by FIG. 5. This body is adjusted to conform to the desired mounting location, such as on the chest or shoulder, which provides an optimal angle for filming or visibility. The second body, in this instance the interior body, is then placed on the inside of the ski jacket, directly opposite the first body. The alignment of the magnets in both bodies ensures a strong magnetic connection through the layers of the ski jacket. Once the bodies are in place, the skier can attach the desired device, such as an action camera, to the mount. For example, a camera may be secured in the puck designed for this purpose, forming a part of the exterior body in an embodiment. In an alternative method of use, the skier can attach the desired device prior to attaching the mount to clothing. The magnetic force between the two bodies keeps the mount stable and securely attached to the jacket, even during vigorous skiing and jumps. This stability is crucial for ensuring that the footage captured by the camera is clear and steady. The present inventor has observed the advantage of adjustability in this exemplary context. It is a teaching of the invention that if the skier needs to adjust the angle of the camera or switch the device, they can easily access the mount without removing their gloves or jacket. The system further provides the benefit of quick adjustments, which is highly beneficial in the cold and fast-paced environments of downhill skiing. Moreover, since the system uses magnetic attachment instead of clips or straps, it minimizes any discomfort and safety risks that might be caused by more rigid or sharply-edged mounting systems. The flexible arms 110 of the mount also ensure that it does not interfere with the skier's movements or safety gear.

In exemplary embodiments of the invention, the mounting system's versatility and adaptability in skiing scenarios can be further enhanced through the incorporation of additional magnet attachment points on various parts of the skier's gear 400. This innovative feature allows for quick and easy repositioning of the mount main body 100, significantly expanding the range of camera angles and mounting options available to the user. The system can be designed to include compatible magnetic attachment points on key pieces of equipment, such as the skier's helmet and skis, in addition to the primary mounting location on the ski jacket 400 in accordance with an intended use. These additional attachment points are engineered to match the magnetic strength and configuration of the mount's main body's 100 flexible arms 110, ensuring a secure and stable connection regardless of the chosen location.

The inclusion of these multiple attachment points offers several advantages in exemplary embodiments. The skier can swiftly move the mount body between different attachment points on their gear, allowing for quick transitions between, for example, a chest-mounted view to a helmet-mounted perspective, or even a ski-mounted angle for capturing ground-level footage. This rapid angle change capability is particularly valuable in the dynamic and time-sensitive environment of skiing. By enabling quick and tool-free repositioning, the system reduces the need for the skier to manipulate small components or make complex adjustments while on the slopes, minimizing distractions and potential safety risks associated with adjusting equipment in challenging conditions.

In exemplary embodiments, the ability to easily switch between multiple mounting points provides skiers with a wider range of creative filming options. They can capture their run from various perspectives without the need for multiple camera setups or time-consuming equipment changes. As lighting conditions or skiing terrain change throughout the day, the skier can quickly adapt their camera position to capture the best possible footage. This flexibility is invaluable for both amateur enthusiasts and professional videographers. The magnetic attachment system ensures that these additional mounting points can be seamlessly integrated into safety equipment like helmets without compromising their protective function. The flexible and low-profile nature of the mount maintains the integrity and comfort of the safety gear.

The implementation of these additional attachment points in exemplary embodiments maintains the core benefits of the original mounting system, including the strong magnetic connection, the flexibility to conform to various surfaces, and the safety features that allow the mount to detach under excessive force. This expanded functionality further distinguishes the system from traditional mounting solutions, offering users an unprecedented level of versatility and ease of use in challenging winter sports environments. The system's design facilitates quick, easy, and safe changes in camera angles, enhancing the overall user experience and creative possibilities for skiers and other winter sports enthusiasts. In various embodiments, to facilitate rapid transition of the mounting system to various points upon a wearer or equipment, the clothing of a wearer or articles of equipment may feature pre-positioned individual opposing magnets placed opposite the magnets 115 embedded within the flexible arms 110 of a main body 100.

The magnetic attachment system designed for this mount offers a significant advantage in terms of its non-invasive nature. Unlike traditional mounts that may require drilling, sewing, or the use of adhesives that could potentially damage the fabric of clothing, this magnetic system preserves the integrity of the clothing. The magnets provide a strong hold without the need for permanent alterations or residues that could stain or weaken the fabric. This feature is particularly beneficial for users who need to mount devices on expensive or delicate garments, such as performance wear or professional uniforms, where maintaining the garment's condition is essential.

Another observed advantage associated with embodiments of the invention is flexibility and ease of use. These are critical in dynamic environments where conditions or requirements can change rapidly. The magnetic attachment system allows for unprecedented ease in making adjustments or removing the mount entirely. Users can reposition the mount in seconds without tools or additional help. This capability is invaluable in scenarios such as news reporting, outdoor photography, or sports, where quick adaptation to new angles or positions can make a difference in the quality of the output. Additionally, the ease of removal ensures that users can swiftly detach the device and mount when no longer needed, enhancing convenience and reducing the time spent on equipment management.

The combination of flexible arms 110 and magnetic attachment expands the possibilities for device placement on clothing or other objects. The flexible arms 110 of the bodies associated with the system can be manipulated to conform to various parts of the wearer's body, whether it's the sleeve, chest, back, or even a hat. This versatility ensures that users can optimize the placement of the camera or device based on their specific needs and the requirements of the activity at hand. For instance, a cyclist might prefer the mount on the back to capture rear-facing footage, while a climber might place it on the helmet for an upward perspective. The ability to easily adjust the placement not only enhances the functionality of the mount but also maximizes the effectiveness of the device being used.

In various embodiments, the system comprising flexible arms 110 with embedded magnets, allows it to adapt to a multitude of environments and purposes beyond mounting to clothing. One example of use involves machinery maintenance. In such exemplary use of the system, the mount can be used in industrial settings to attach diagnostic tools or lights to machinery. Its ability to conform to metallic surfaces of complex machinery allows maintenance personnel to work hands-free, enhancing safety and efficiency. For instance, during a turbine inspection, the mount can securely hold a flashlight or a camera to record the condition of the machinery, providing stable footage despite the vibrations and movements typical in such environments.

In another exemplary use, on construction sites, the system can be wrapped around structural elements like beams or posts to hold measuring devices or action cameras. This setup is particularly useful for monitoring work progress or conducting safety inspections, where recording or live-streaming the procedure can provide valuable documentation and compliance evidence.

Other exemplary uses include office or home environments, where the mount can be used to organize tools or gadgets. For example, it can securely hold tablets or smartphones on a desk or workshop table, adjusting to different angles suitable for video calls, watching tutorials, or following digital blueprints. In the kitchen, the system can be adapted for use in kitchens to hold recipe tablets or smartphones, attaching securely to appliances like refrigerators or metal cabinets. This allows for easy viewing of recipes or cooking videos without occupying counter space or risking damage to devices from spills. In creative settings, the system can be used to hold cameras or lights around different studio equipment, providing artists and musicians with the ability to record sessions hands-free. The flexibility of the mount allows it to be positioned around instruments, easels, or other artistic tools, capturing various angles of the creative process. For sports training environments, the system can be used to attach cameras to gym equipment, providing athletes and coaches with the ability to record and analyze training sessions. The secure attachment ensures that the camera remains stable during vigorous activities, such as on punching bags, weight racks, or even attached to basketball hoops for unique gameplay footage.

In another exemplary use related to field research, the system can be used to attach scientific instruments or cameras to natural elements like trees or underwater structures, facilitating environmental monitoring or wildlife studies. Its ability to securely wrap around irregular shapes and withstand environmental conditions makes it invaluable for capturing data in remote or challenging locations. For emergency responders in another exemplary use, the system can be used to attach critical tools or lighting to vehicles or equipment. Its quick deployment and secure hold can enhance operational efficiency during emergencies, allowing for hands-free lighting or recording in search and rescue operations.

These examples demonstrate the broad applicability of the mount across various industries and activities. Its unique combination of flexibility, secure magnetic attachment, and durability enables it to meet the needs of diverse applications, from professional and industrial to recreational and creative endeavors.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention.

Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

The invention claimed is:

1. A mounting system for attaching devices to various surfaces, the system comprising:
   a plurality of bodies,
   at least two bodies of the plurality of bodies opposing each other on opposite sides of an object,
   each body of the plurality of bodies comprising a receptacle configured to retain a first interchangeable puck and
   a second interchangeable pucks,
   each of the first and second interchangeable pucks configured to attach a specific device.

2. The mounting system of claim 1, further comprising:
   Each of the plurality of bodies equipped with a plurality of flexible arms embedded with magnets; and
   wherein the magnets in opposing bodies are alignable to create a compounded magnetic effect through an intervening material.

3. The mounting system of claim 2, wherein both bodies are configured to accommodate any of the interchangeable pucks, allowing for a variety of attachment points on both the exterior and interior sides of an object.

4. The mounting system of claim 2, wherein each body accommodates a plurality of pucks simultaneously, enabling the attachment of various devices or tools to a single body.

5. The mounting system of claim 2, further comprising support accessories selected from the group consisting of lanyards and body mounts, configured to aid in supporting the external body.

6. The mounting system of claim 2, wherein the magnets embedded in the flexible arms are neodymium magnets.

7. The mounting system of claim 2, wherein the flexible arms bend and wrap around non-planar and irregular surfaces without losing structural integrity.

8. The mounting system of claim 1, wherein the interchangeable pucks are compatible with both an exterior body and an interior body of the mounting system, providing flexibility in device attachment configurations.

9. The mounting system of claim 1, wherein each of the first and second interchangeable pucks comprises a low-profile design that withstands speeds up to 90 mph when attached to a vehicle.

10. The mounting system of claim 1, wherein each of the one or a plurality of interchangeable pucks are constructed from ABS polyurethane and include configurations for attaching an item selected from the group consisting of cameras, tablets, RFID tags, and tools.

11. The mounting system of claim 2, comprising one or more additional embedded or individual magnets stacked over at least one of the magnets embedded in the flexible arms.

12. The mounting system of claim 2, further comprising the capability to stack multiple bodies to enhance the magnetic holding force by up to 80%.

13. The mounting system of claim 2, wherein the magnets embedded in the flexible arms are stacked or supplemented with additional magnetic discs to increase the total magnetic holding force.

14. The mounting system of claim 1, wherein the one or a plurality of interchangeable pucks feature a retention groove that interacts with a groove engagement mechanism in a receptacle to securely lock the corresponding puck in place in the receptacle.

15. The mounting system of claim 2, wherein the bodies are configured such that the flexible arms of one body can be placed corresponding to the arms of another body on another side of an object, such as fabric, to allow the opposing magnets to generate a clamping force upon the object.

16. The mounting system of claim 2, further comprising support accessories designed to work in conjunction with the magnetic attachment system to enhance stability and weight distribution of attached devices.

* * * * *